(12) United States Patent
Chang

(10) Patent No.: US 6,978,337 B1
(45) Date of Patent: Dec. 20, 2005

(54) SERIAL ATA CONTROLLER HAVING FAILOVER FUNCTION

(75) Inventor: Po-Chien Chang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 348 days.

(21) Appl. No.: 10/307,845

(22) Filed: Dec. 2, 2002

(51) Int. Cl.$^7$ .............................................. G06F 13/36
(52) U.S. Cl. ...................... 710/306; 710/305; 710/312; 710/313; 710/315; 710/316
(58) Field of Search .............................. 710/305–306, 710/312–313, 315–316

(56) References Cited

U.S. PATENT DOCUMENTS

| | | | |
|---|---|---|---|
| 4,456,965 A * | 6/1984 | Graber et al. | 710/100 |
| 4,747,047 A * | 5/1988 | Coogan et al. | 710/38 |
| 5,812,754 A * | 9/1998 | Lui et al. | 714/6 |
| 5,828,854 A * | 10/1998 | Wade | 710/315 |
| 5,848,278 A * | 12/1998 | Sakai | 710/260 |
| 6,073,188 A * | 6/2000 | Fleming | 710/38 |
| 6,223,238 B1 * | 4/2001 | Meyer et al. | 710/312 |
| 6,330,687 B1 * | 12/2001 | Griffith | 714/6 |
| 6,697,867 B1 * | 2/2004 | Chong, Jr. | 709/229 |
| 6,813,688 B2 * | 11/2004 | Wu et al. | 711/114 |
| 2002/0159311 A1 * | 10/2002 | Coffey et al. | 365/200 |
| 2002/0186706 A1 * | 12/2002 | Chien et al. | 370/461 |
| 2004/0024950 A1 * | 2/2004 | Surugucchi | 710/316 |
| 2004/0081179 A1 * | 4/2004 | Gregorcyk | 370/402 |
| 2004/0083323 A1 * | 4/2004 | Rabinovitz et al. | 710/315 |

OTHER PUBLICATIONS

Nanda, Sanjeeb, "SATA vs. PATA," Nov. 2002, Computer Technology Review, p. 18.*
Benway, Alan, "Taking a Ride on the Bus," Apr. 2000, Workstation Expert, p. 32 and 34-37 (5 pages).*
Benway, Alan, "Raid Anatomy 101," Oct. 2000, Servier Workstation Expert, p. 36-45 (7 pages).*
"The Authoritative Dictionary of IEEE Standards Terms, Seventh Edition," Dec. 2000, IEEE, p. 123-124.*

* cited by examiner

Primary Examiner—Rehana Perveen
Assistant Examiner—Donna K. Mason

(57) ABSTRACT

A select circuit including a first device bridge to communicate a first stream of information between a first Serial ATA bus and a storage device bus. A second device bridge to communicate a second stream of information between a second Serial ATA bus and the storage device bus. A controller, in response to a select signal, to enable one of the first bridge device and the second bridge device to control a flow of the first stream of information and the second stream of information between the storage device bus and the first and second Serial ATA buses.

30 Claims, 3 Drawing Sheets

US 6,978,337 B1

SERIAL ATA CONTROLLER HAVING FAILOVER FUNCTION

TECHNICAL FIELD

This invention relates to Serial Advanced Technology Attachment (SATA) input/output (I/O) assemblies.

BACKGROUND

The parallel ATA (Advanced Technology Attachment) specification has defined the standard storage interface for PCs since the early 1980s. Parallel ATA provides low cost, broad operating system support, and steady evolution. Over time, parallel ATA has continuously evolved to support higher speed and performance. However, due to several reasons, including performance headroom, cabling issues, and voltage tolerance requirements, a new storage interface known as Serial ATA has recently been created.

Serial ATA may combine software transparency, low cost, scalability, and design flexibility to overcome the limitations of parallel ATA. Point-to-point data rates of 1.5 Gbps may be attainable with Serial ATA. Although high point-to-point data rates may increase the functionality of each data channel, the loss of a data channel may have a greater impact on system performance due to the loss of a greater amount of information. Therefore, redundant data channels may be desirable. However, implementing redundant data channels is problematic.

SUMMARY

A select circuit includes a first device bridge that communicates a first stream of information between a first Serial Advanced Technology Attachment (ATA) bus and a storage device bus. A second device bridge communicates a second stream of information between a second Serial ATA bus and the storage device bus. A controller, in response to a select signal, enables one of the first bridge device and the second bridge device to control a flow of the first stream of information and the second stream of information between the storage device bus and the first and second Serial ATA buses.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
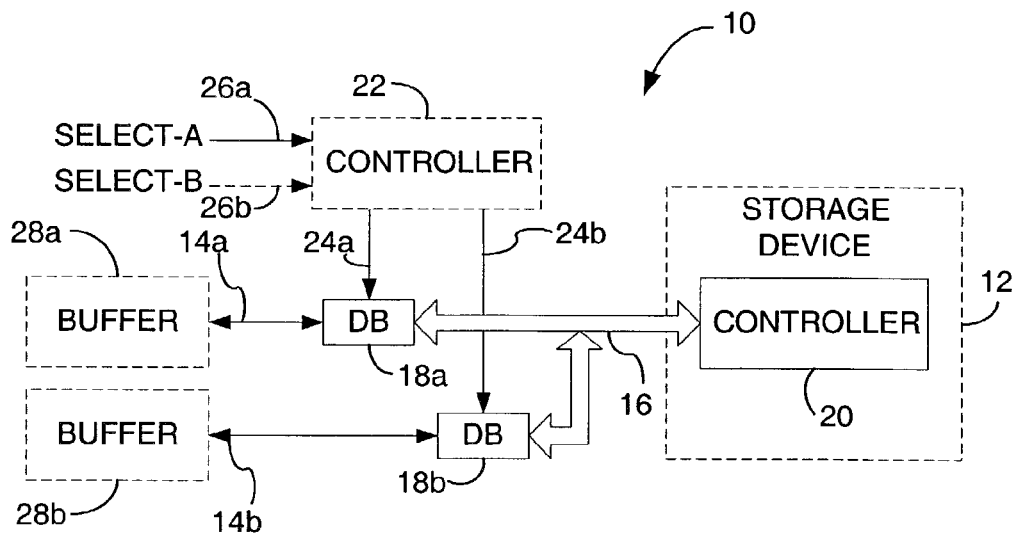
FIG. 1 is a block diagram of an aspect of an I/O select circuit.

FIG. 1 shows an I/O select circuit 10 for controlling an interface between a storage device 12 and several streams of data communicated over Serial ATA compliant buses 14a and 14b. The storage device 12 may be any device for storing information such as a hard disk drive (HDD) and a CD-ROM. The I/O select circuit 10 may interface to two or more Serial ATA compliant buses. The I/O select circuit 10 may be implemented in any type of assembly such as on a single semiconductor die, as a multi-chip module (MCM), and within separate devices. A Complementary Metal Oxide Semiconductor (CMOS) fabrication process is particularly suitable for fabricating the I/O select circuit 10, however any type of fabrication process may be used.

Each of the Serial ATA compliant buses 14a and 14b is connected to a storage device bus 16 through corresponding device bridges 18a and 18b.

In one aspect, the storage device bus 16 may be Parallel ATA compliant. Here, the device bridges 18a and 18b enable the use of high-speed Serial ATA connectivity while using a low-cost, widely available Parallel ATA controller 20 to interface to the storage device 12. The device bridges 18a and 18b connect to the parallel ATA bus 16 in an OR configuration so that one of the device bridges 18a and 18b may transfer information through the Parallel ATA bus 16 at a time. Each of the device bridges 18a and 18b may receive Serial ATA commands communicated over the Serial ATA compliant buses 14a and 14b. The device bridges 18a and 18b may decode the commands and convert them to Parallel ATA device commands. For responses from the Parallel ATA bus 16, the device bridges 18a and 18b may decipher, process, and convert the responses to Serial ATA protocol and communicate the responses over the Serial ATA compliant buses 14a and 14b.

A controller 22 may be included to implement one or more operating modes for controlling the device bridges 18a and 18b. One of the device bridges 18a and 18b may be enabled at a time. The enabled device bridge may communicate information between one of the Serial ATA buses 14a and 14b and the Parallel ATA bus 16.

In a first operating mode, the controller 22 may switch between the device bridges 18a and 18b depending on the state of one of the select inputs 26a and 26b. In another aspect, one of the select inputs 26a and 26b may be connected directly to the device bridges 18a and 18b eliminating the controller 22.

In a second operating mode, the controller 22 may generate enable signals 24a and 24b based on the select inputs 26a and 26b and a state machine to control each of the device bridges 18a and 18b. The enable signals 24a and 24b are preferably digital control signals having an enable state and a disable state. However, other signal types may also be used such as ternary signals. A single enable signal instead of multiple enable signals may also be used with predetermined levels of the enable signal corresponding to an enable indication for different ones of the device bridges. For example, in an I/O select circuit having only two device bridges, a high level of the single enable signal may enable one device bridge, while a low level may enable the other device bridge.

Two or more select signals 26a and 26b may communicate the desired state of the device bridges 18a and 18b to the bridge controller 22. The select signals 26a and 26b are preferably digital signals having an enable state and a disable state. The select signals 26a and 26b may be sent from a system controller (not shown) to control the state of the bridge devices 18a and 18b.

Buffers 28a and 28b may buffer the signals flowing through the Serial ATA compliant buses 14a and 14b. The buffers 28a and 28b are particularly suitable for providing a continuous flow of information during a switchover from one device bridge to another device bridge. One or more buffers may be used to buffer the Serial ATA signals. Any type of buffer may be used including volatile memory.

Figure 2:
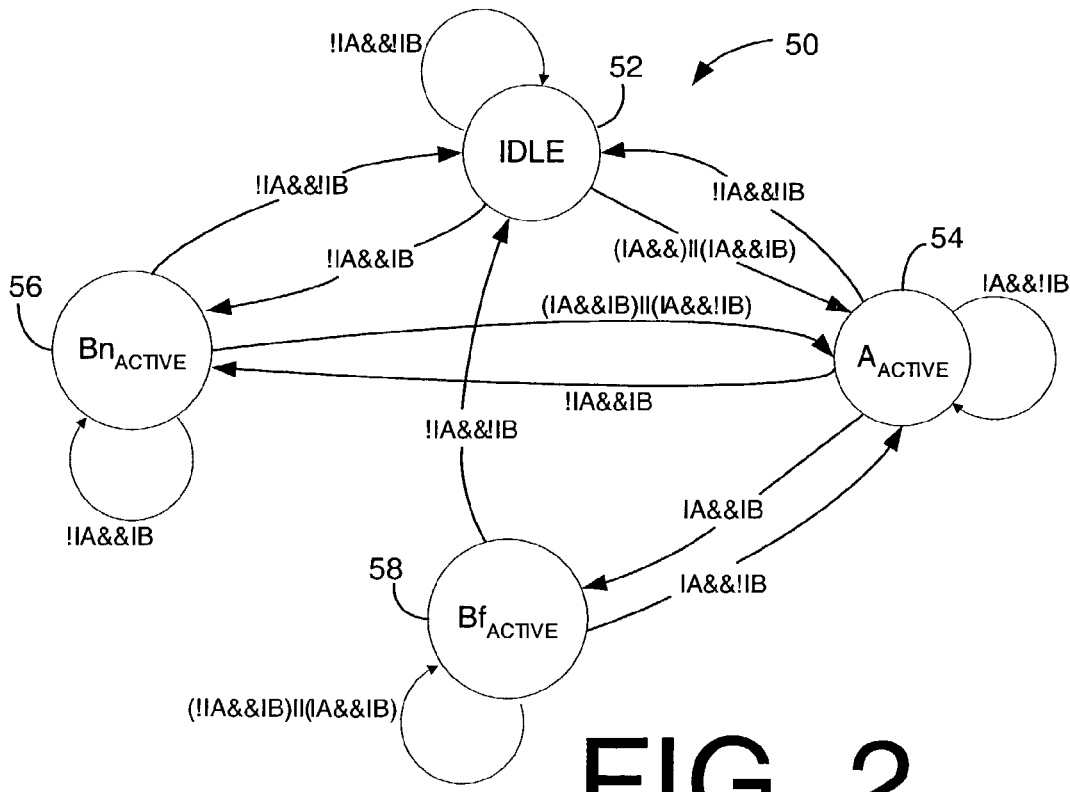
FIG. 2 is a state diagram of an aspect of an I/O select circuit.

FIG. 2 shows a state machine 50 illustrating the operation of an aspect of the bridge controller 22. In FIG. 2, IA represents a Select-A input and IB represents a Select-B input. An idle state 52 is entered when both select inputs indicate that both device bridges 18a and 18b should be disabled. An $A_{ACTIVE}$ state 54 is entered when one select input indicates a primary one of the device bridges 18a and 18b should be enabled, and the other select input indicates the other one of the device bridges 18a and 18b should be disabled. In the $A_{ACTIVE}$ state 54 the primary one of the device bridges 18a and 18b is enabled and the secondary one of the device bridges 18a and 18b is disabled. A $Bn_{ACTIVE}$ state 56 is entered when one select input indicates a secondary one of the device bridges 18a and 18b should be enabled, and the other select input indicates the primary one of the device bridges 18a and 18b should be disabled. In the $Bn_{ACTIVE}$ state 56 the secondary one of the device bridges 18a and 18b is enabled, and the primary one of the device bridges 18a and 18b is disabled. A $Bf_{ACTIVE}$ state 58 is entered when Channel A fails, such as when the select inputs indicate that both of the device bridges 18a and 18b should be enabled. In the $Bf_{ACTIVE}$ state 58 the secondary device bridge is enabled and the primary device bridge is disabled.

The I/O select circuit 10 is particularly suitable for providing redundant operation to minimize the loss of information when a failure occurs in either the path of the select signals or in the Serial ATA links. When one of the Serial ATA links fails, the bridge controller enables the device bridge that controls the other Serial ATA link to reestablish a path from the storage device to the Serial ATA link. A buffer may be included in the path to reduce the loss of data while the connection between the Serial ATA link and the storage device is being reestablished.

Figure 3:
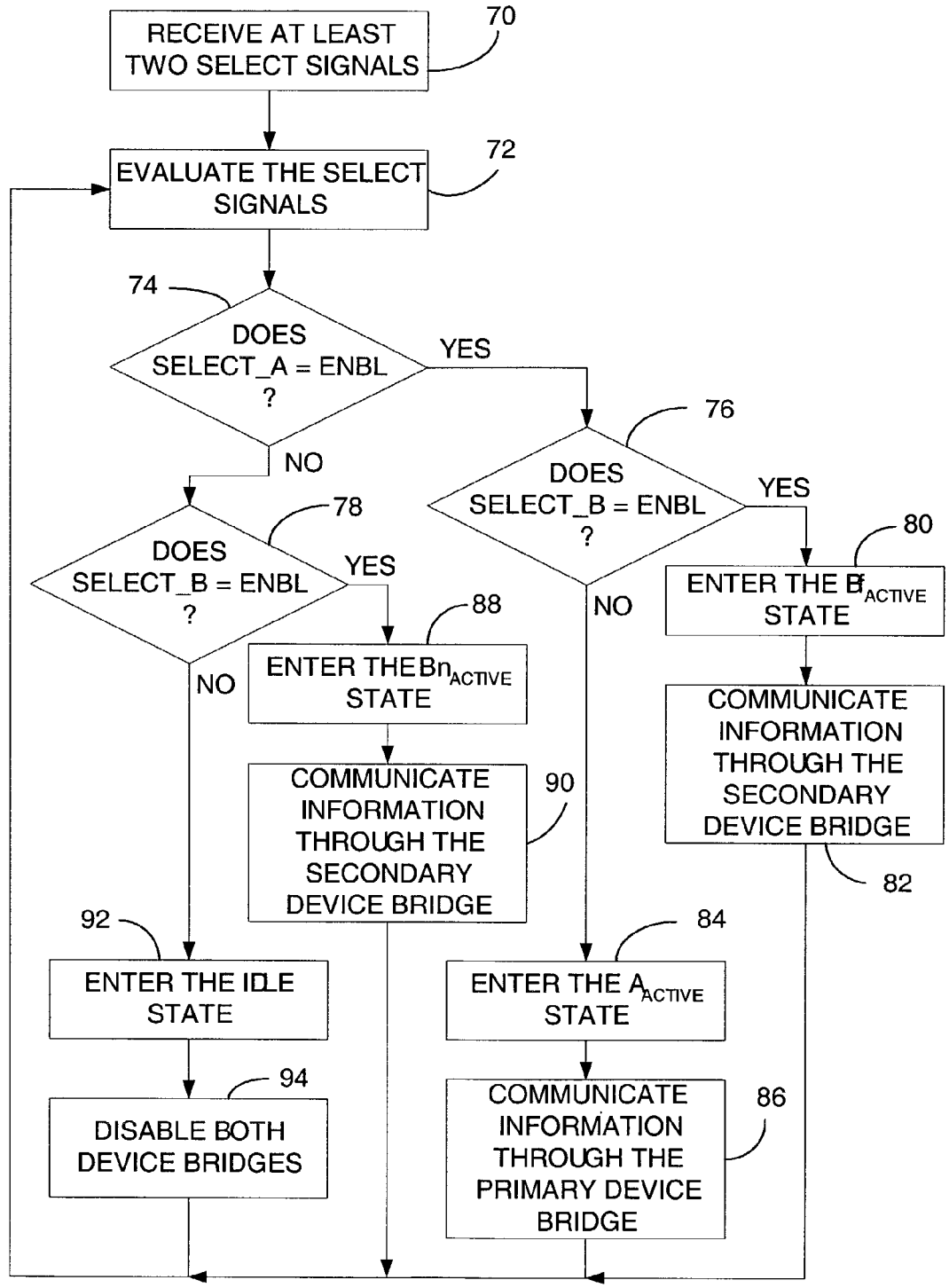
FIG. 3 is a flow diagram of an aspect of an I/O select circuit.

FIG. 3 shows a flow diagram of an aspect of the operation of the I/O select circuit 10. Starting at block 70, at least two select signals are received. Continuing to block 72, the select signals are evaluated to determine into what state the device bridges 18a and 18b should be commanded. At decision block 74, if the SELECT-A signal indicates enabling one of the device bridges, then continuing to decision block 76 the SELECT-B signal is evaluated. If the SELECT-B signal indicates enabling one of the device bridges, then continuing to block 80, operating state $Bf_{ACTIVE}$ is entered and information is communicated through the secondary device bridge, block 82.

Returning to decision block 76, if the SELECT-B signal indicates disabling the secondary device bridge, then continuing to block 84, operating state $A_{ACTIVE}$ is entered and information is communicated through the primary device bridge, block 86.

Returning to decision block 74, if the SELECT-A signal indicates disabling the primary device bridge, then continuing to decision block 78 the SELECT-B signal is evaluated. If the SELECT-B signal indicates enabling one of the device bridges, then continuing to block 88, operating state $Bn_{ACTIVE}$ is entered and information is communicated through the secondary device bridge, block 90.

Returning to decision block 78, if the SELECT-B signal indicates disabling the secondary device bridge, then continuing to block 92, operating state IDLE is entered and both device bridges are disabled, block 94.

Figure 4:
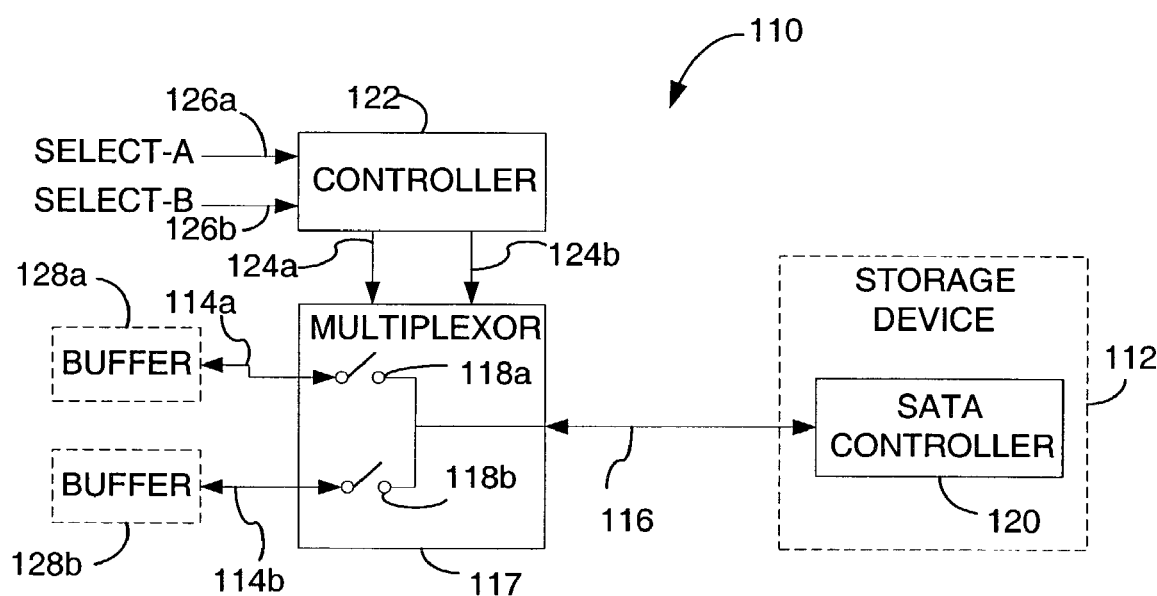
FIG. 4 is a block diagram of an aspect of an I/O select circuit.

FIG. 4 shows another aspect of an I/O select circuit 110. I/O select circuit 110 is similar to I/O select circuit 10 in function with corresponding elements numbered in the range 110–130, except that I/O select circuit 110 may control an interface between a SATA device link 112 and several SATA host links 114a and 114b.

A multiplexor 117 may, in response to one or more enable signals 124a and 124b, establish a link between one of the SATA host links 114a and 114b and the SATA device link 112. The multiplexor 118 may establish the link through PHY (physical) layer switches 118a and 118b connected to each of the SATA host links 114a and 114b.

A controller 122 may include the state machine 50 to control the enable signals 124a and 124b as a function of select signals 126a and 126b. The state machine 50 operates as described earlier in this specification. The controller 122 may be a standalone entity or included within the multiplexor 118.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
   a first serial Advanced Technology Attachment (ATA) bus;
   a second serial ATA bus;
   a parallel ATA storage device bus;
   a select circuit that communicates with said first and second serial ATA buses and said parallel ATA storage device bus and that comprises:
      a first device bridge that bidirectionally converts a first serial data stream on the first serial ATA bus to a parallel data stream on the parallel ATA storage device bus;
      a second device bridge that bidirectionally converts a second serial data stream on the second serial ATA bus to said parallel data stream on the parallel ATA storage device bus; and
      a controller that selectively enables one of said first device bridge and said second device bridge to control data flow between the first and second serial ATA buses and the parallel ATA storage device bus.

2. The system of claim 1 wherein said controller selectively enables said first and second device bridges based on a select signal that includes a first signal corresponding to said first device bridge and a second signal corresponding to said second device bridge.

3. The system of claim 2 wherein said first signal has an enable state and a disable state, said second signal has an enable state and a disable state, and said controller enables said second device bridge when said second signal is in said enable state.

4. The system of claim 2 wherein said controller enables said first device bridge when said first signal is in said enable state and said second signal is in said disable state.

5. The system of claim 2 wherein said first signal is in either of said enable state and said disable state.

6. The system of claim 1 wherein said controller generates a first enable signal to control said first device bridge and a second enable signal to control said second device bridge.

7. A system comprising:
   first and second serial Advanced Technology Attachment (ATA) buses;
   a parallel ATA storage device bus;
   first bridge means for bidirectionally converting a first serial data stream on the first serial ATA bus to a parallel data stream on the parallel ATA storage device bus;

second bridge means for bidirectionally converting a second serial data stream on the second serial ATA bus to said parallel data stream on the parallel ATA storage device bus; and control means for selectively enabling one of the first bridge means and the second bridge means to control data flow between the parallel ATA storage device bus and the first and second serial ATA buses.

8. The system of claim 7 wherein said control means selectively enables said first and second bridge means based on a select signal that includes a first signal corresponding to said first bridge means and a second signal corresponding to said second bridge means.

9. The system of claim 8 wherein said first signal has an enable state and a disable state, said second signal has an enable state and a disable state, and said control means enables said second bridge means when said second signal is in said enable state.

10. The system of claim 8 wherein said control means enables said first bridge means when said first signal is in said enable state and said second signal is in said disable state.

11. The system of claim 8 wherein said first signal is in either of said enable state and said disable state.

12. The system of claim 7 wherein said control means generates a first enable signal to control said first bridge means and a second enable signal to control said second bridge means.

13. A method for selecting an input/output path, comprising:

bidirectionally converting a first serial data stream on the first serial Advanced Technology Attachment (ATA) bus to a parallel data stream on a parallel ATA storage device bus;

bidirectionally converting a second serial data stream on a second serial ATA bus to said parallel data stream on the parallel ATA storage device bus; and selectively enabling data flow between the first and second serial ATA buses and the parallel ATA storage device bus.

14. The method of claim 13 further comprising generating a first signal to enable a first device bridge and a second signal to enable a second device bridge.

15. The method of claim 14 wherein said first signal has an enable state and a disable state, said second signal has an enable state and a disable state, and further comprising enabling said second device bridge when said second signal is in said enable state.

16. The method of claim 14 further comprising enabling said first device bridge when said first signal is in said enable state and said second signal is in said disable state.

17. The method of claim 14 wherein said first signal is in either of said enable state and said disable state.

18. The method of claim 13 further comprising generating a first enable signal to control said first device bridge and a second enable signal to control said second device bridge.

19. A select circuit, comprising:

a first device bridge that bidirectionally converts a first serial data stream on a first serial Advanced Technology Attachment (ATA) bus to a parallel data stream on a parallel ATA storage device bus;

a second device bridge that bidirectionally converts a second serial data stream on a second serial ATA bus to said parallel data stream on the parallel ATA storage device bus; and a controller that selectively enables one of said first device bridge and said second device bridge to control data flow between the first and second serial ATA buses and the parallel ATA storage device bus.

20. The select circuit of claim 19 wherein said controller selectively enables said first and second device bridges based on a select signal that includes a first signal corresponding to said first device bridge and a second signal corresponding to said second device bridge.

21. The select circuit of claim 20 wherein said first signal has an enable state and a disable state, said second signal has an enable state and a disable state, and said controller enables said second device bridge when said second signal is in said enable state.

22. The select circuit of claim 20 wherein said controller enables said first device bridge when said first signal is in said enable state and said second signal is in said disable state.

23. The select circuit of claim 20 wherein said first signal is in either of said enable state and said disable state.

24. The select circuit of claim 19 wherein said controller generates a first enable signal to control said first device bridge and a second enable signal to control said second device bridge.

25. A select circuit, comprising:

first bridge means for bidirectionally converting a first serial data stream on a first serial ATA bus to a parallel data stream on a parallel ATA storage device bus;

second bridge means for bidirectionally converting a second serial data stream on a second serial ATA bus to said parallel data stream on the parallel ATA storage device bus; and control means for selectively enabling one of the first bridge means and the second bridge means to control data flow between the parallel ATA storage device bus and the first and second serial ATA buses.

26. The select circuit of claim 25 wherein said control means selectively enables said first and second bridge means based on a select signal that includes a first signal corresponding to said first bridge means and a second signal corresponding to said second bridge means.

27. The select circuit of claim 26 wherein said first signal has an enable state and a disable state, said second signal has an enable state and a disable state, and said control means enables said second bridge means when said second signal is in said enable state.

28. The select circuit of claim 26 wherein said control means enables said first bridge means when said first signal is in said enable state and said second signal is in said disable state.

29. The select circuit of claim 26 wherein said first signal is in either of said enable state and said disable state.

30. The select circuit of claim 25 wherein said control means generates a first enable signal to control said first bridge means and a second enable signal to control said second bridge means.

* * * * *